March 29, 1932.                C. L. BASTIAN                 1,851,415
                            GAS SHUT-OFF DEVICE
                          Filed Nov. 23, 1929         2 Sheets-Sheet 2
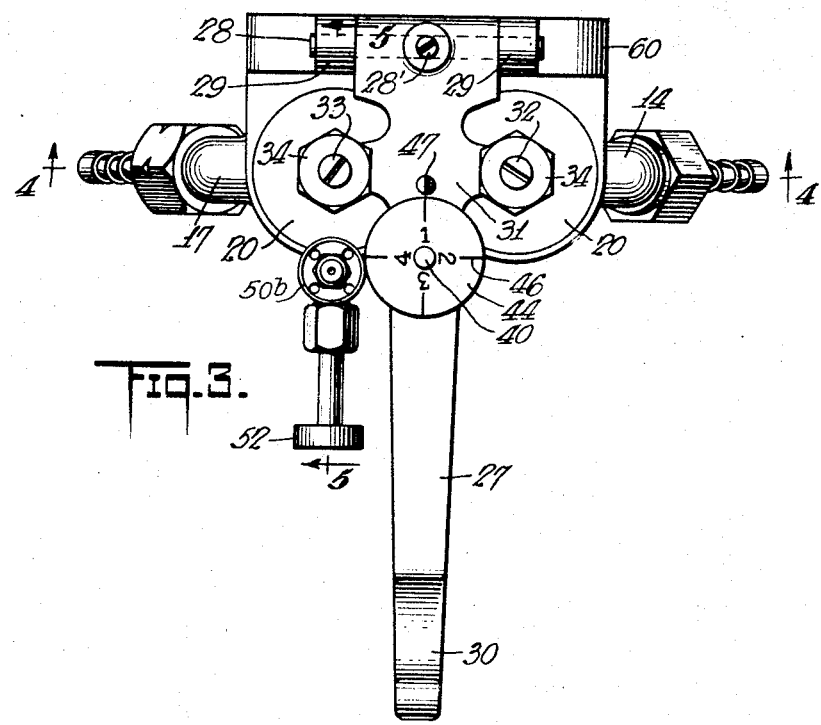
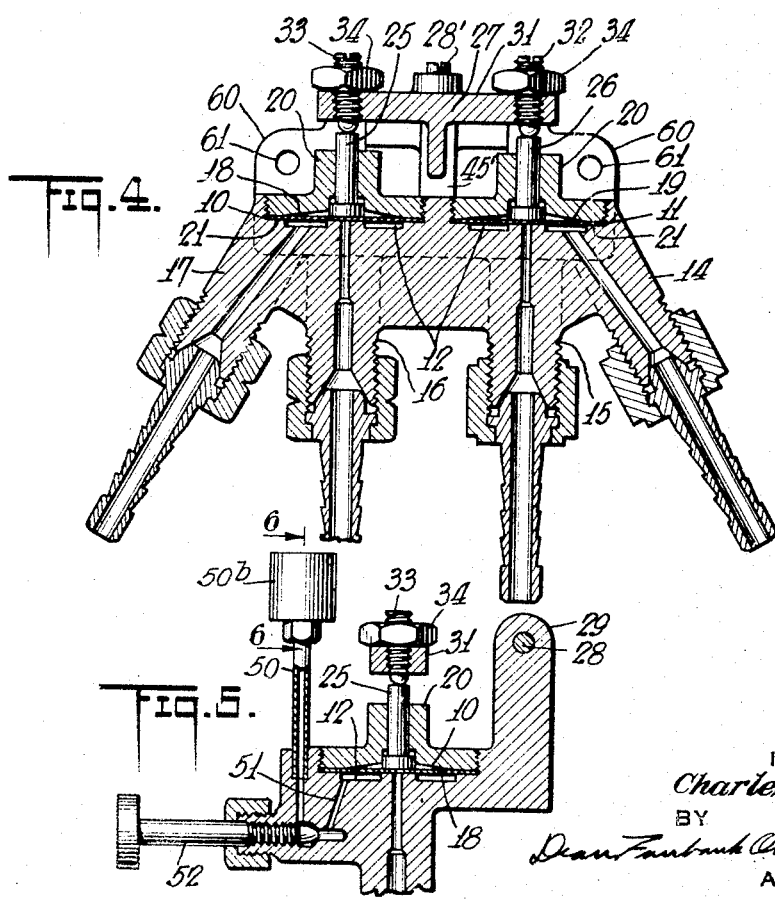
INVENTOR
Charles L. Bastian
BY
ATTORNEYS Patented Mar. 29, 1932

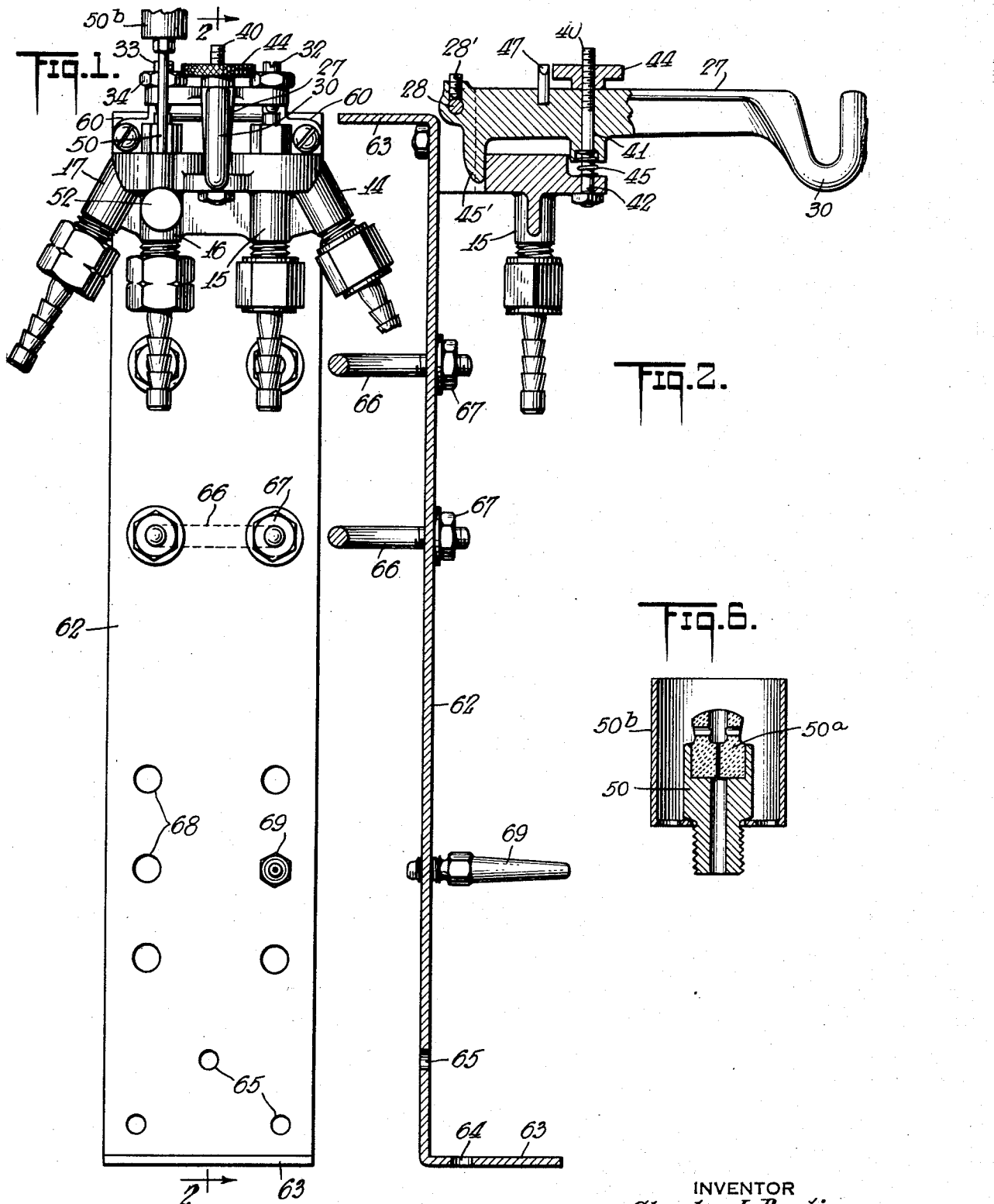

1,851,415

UNITED STATES PATENT OFFICE

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS

GAS SHUT OFF DEVICE

Application filed November 23, 1929. Serial No. 409,231.

This invention is an improved gas shut-off device adapted for use in connection with an oxy-acetylene or other torch, and is of the type in which the valve closing means serves as a support for the torch, whereby when the torch is placed on said support the flow of gases to the torch will be automatically shut off.

One object of the present invention is to provide a simple construction inexpensive to manufacture and which may be readily adjusted to insure the proper flow of the gases.

A further object is to so design the parts that all of the hose connections are to a stationary valve block so designed that the movable parts may be readily taken off for replacement, repair or adjustments.

A further object is to provide means whereby the control valves may be held in closed position even though the torch be removed from the valve-operating torch supporting lever.

A further object is to provide means for readily obtaining a predetermined gas flow when the valves are reopened after being closed by the last mentioned means.

A further object is to provide a simple support whereby the valve block may be readily attached to a bench, work table or part and may serve also to carry spare tips for the torch.

A further object is to provide a pilot light in a convenient position for relighting the torch when lifted from the torch support.

A further object is to provide a pilot light having an insulating tip with air vent holes to prevent carbonization at the pilot tip.

A further object is to provide a windshield or guard about the pilot flame to prevent the flame from being extinguished by sudden drafts of air.

A further object is to provide a construction to eliminate sliding stems requiring stuffing boxes and packing, wear of which might cause leaks of either gas supply.

Other advantages of the improved construction will be apparent from the following description and the accompanying drawings.

In these drawings:

Fig. 1 is a front elevation of a device constructed in accordance with the present invention, Fig. 2 is a vertical section on the line 2—2 of Fig. 1, Fig. 3 is a top plan view, Fig. 4 is a section on the line 4—4 of Fig. 3, Fig. 5 is a detail sectional view taken on the line 5—5 of Fig. 3, and Fig. 6 is an enlarged sectional view of the pilot light burner.

The device illustrated is a multiple valve structure, having two valves 10 and 11 for the two separate gases to be supplied to the torch. The valve housings are preferably cast or otherwise formed in an integral structure having a plurality of tubular bosses or nipples 14, 15, 16 and 17. The nipples 14 and 17 may diverge toward the two supply tanks which may be on opposite sides of the apparatus, while the nipples 15 and 16 are parallel and close together for the hose to the torch. The nipples 14 and 15 have inlet and outlet passages respectively for the valve 11 and the nipples 16 and 17 have outlet and inlet passages respectively for the valve 10. These nipples are so constructed as to facilitate the connecting of the supply and delivery hose thereto. Each valve includes an annular chamber 12, around a central boss of relatively small diameter. The outlet passage leads through the boss while the inlet passage leads directly to the chamber 12 so as to supply gas to the entire interior of the chamber.

The outlet passages of the valves 10 and 11 are controlled by valve members 18 and 19 preferably in the form of flexible diaphragms, which are arranged to engage or move away from the ends of the bosses and the outlet passages. The diaphragms 18 and 19 are each retained in position by a removable cap 20, which clamps the edge of the diaphragm against a suitable annular shoulder 21, encircling the chamber 12. In the present instance, these caps have screw threaded engagement with their respective housing, but it is to be understood that they may be secured thereto in various other ways.

Plungers 25 and 26 engage the diaphragms on the surfaces opposite to the outlets and extend through and are guided by the caps. A lever 27 is pivotally mounted on a pin 28 supported in lugs or the like 29, preferably formed integral with the valve structure, and is rocked upwardly about its pivotal center by the action of a coil spring 45. This upward movement of the lever may, if desired, be limited by means of a depending lug 45', which engages the valve structure as shown in Fig. 2.

The valves are arranged side by side and the lever 27 is provided with a cross arm 31 of such length that its end portions occupy positions over the plungers 25 and 26. Threaded in the ends of the cross arm 31, opposite to the plungers, are adjusting screws 32 and 33, each of which is provided with a jam nut 34, by means of which it may be maintained in its adjusted position. By this arrangement when the lever 27 is rocked downwardly about its pivotal point, the adjusting screws engage their respective plungers and force the same downwardly, causing the valve members 18 and 19 to close the discharge passages of the chambers 12. The lever has a hooked end 30 for receiving a torch to which the hose from the nipples 15 and 16 extend. The valve members are moved to open the discharge passages by gas pressure in the chambers 12 and the weight of the tool when the latter is hung on is sufficient to maintain the valve members 18 and 19 in closed position against the action of this pressure. The gas pressure will not be great enough to move the valve members to open position except when the tool is removed from the hooked end of the pivoted lever 27.

The degree of opening of the valve members 18 and 19 may be determined by the adjustment of the screws 32 and 33. By means of this arrangement it is not necessary to make the parts with any great degree of accuracy as inaccuracy in drilling the hole for the pivot pin or in other respects may be compensated for and the valves may be caused to close and open together or one slightly in advance of the other.

Means is also provided to control the volume of flame by controlling the extent to which the valves may open by limiting the pivotal movement of the lever 27. As shown, this comprises a bolt 40 passing through an opening 41 in the lever 27 and suitably anchored as at 42 to the valve block. The upper end is threaded to receive a nut 44, bearing directly upon the upper face of the lever 27. The bolt extends through the spring 45 which is interposed between the valve block and the lever, and the nut limits the upward movement of the lever under the action of this spring at any desired point. The position of the pivoted lever 27 determines the extent of movement of the plungers 25 and 26 and thereby, the extent to which the valve members 18 and 19 may open the discharge passages. By adjustment of the nut the consequent volume of the fluid supply to maintain a flame of desired intensity may be determined and need not be re-adjusted between successive uses of the torch.

As illustrated in Fig. 3, the nut 44 may be provided upon its upper face with calibrations such as 46, which coincide with an index pointer or the like 47 to indicate the adjustment of the valves. In addition to providing means for adjusting the limiting position of the lever 27, the nut 44 also serves as means for maintaining the valve members 18 and 19 in their closed position, when desired, even if the torch be removed. If it is desired to shut it down for a period of time, for example, over night, the nut 44 may be screwed down until the plungers 25 and 26 engage their respective valve members and force them to the position in which they close their respective discharge passages. The torch may then be removed without opening the gas passages. If, before the above described operation were started, a note be made of the position of the calibrations of the nut 44 relative to the index pointer 47, it is only necessary to back off the nut 44 to the noted position to obtain a flame of the same intensity as that of the flame previously being used.

A pilot burner 50 is supplied from the chamber 12 of the valve 10, by means of a passage 51 controlled by a valve 52 preferably of the needle type.

With the parts so adjusted, it will be obvious that each time the torch is placed upon the hook 30 of the lever 27, the lever 27 will be rocked downwardly about its pivotal point and through the engagement of the screw 32 and 33 with the plungers 25 and 26, the valves 18 and 19 will be moved to closing position and the supply of oxygen and acetylene gas to the torch will be cut off and the flame extinguished. Immediately upon removal of the torch from the hook lever 27, the spring 45 elevates the hooked end of the lever. As the nut 44 limits the opening movement, the lug 45' may be entirely omitted, if desired. The weight of the lever being removed from the plungers 25 and 26, the valve members 18 and 19 move to open position under the influence of the gas pressure in the chambers 12, thus permitting a free flow of acetylene gas and oxygen through the discharge passages to the torch. The torch is ignited by bringing the discharge end thereof into the presence of the flame of the pilot burner 50, it being understood that the pilot burner will be maintained lighted during the period of use of the torch.

The pilot burner is so constructed that it is in a convenient position for the relighting of the torch. It has an insulating tip to prevent carbonization and a windshield to guard the very small flame from being extinguished. As shown particularly in Fig. 6 the burner 50 has a tip 50a of lava or other insulating material with side apertures therethrough for air and around the tip is a windshield or guard 50b provided with apertures at the bottom and directing the flame against air draft.

When it is desired to gain access to the valve members 18 and 19 for the purpose of renewal or repair, it is only necessary to remove the lever 27 and the caps 20. This may be accomplished by removing the pivot pintle 28 of the lever 27, after loosening a locking set screw 28'. After the lever 27 has been removed, the caps 20 may be removed, leaving the entire interior of the valves 10 and 11 freely accessible. This does not disturb the hose attachment to the valve block.

The valve block includes a pair of lugs 60 each of which is provided with a perforation 61 for screws or bolts by which the device may be attached to a wall or other suitable support.

In the present embodiment of the invention, a support for the valve structure is illustrated as including an elongated sheet metal plate 62 formed with angular ends 63 preferably oppositely disposed with relation to each other. The angularly disposed end 63 is provided with openings 64 so that this end 63 may form a foot for securing the support 62 to the top of a work bench or similar article. The elongated body portion may also be provided with a plurality of openings 65 by means of which the support 62 may be secured to the side of a bench. If it is desired to mount the support 64 upon a stanchion or similar structure, there are provided U bolts 66, the legs of which are threaded for the reception of nuts 67, and pass through the elongated body portion. The body portion of the support may also be provided with a plurality of threaded openings 68, each adapted to receive a torch tip, as shown at 69, thus affording means whereby a supply of such nozzles is always at the convenience of the operator.

Having thus described my invention, what I claim as new and desire to secure by Letters Patent is:

1. A gas shut off device for torches, including a stationary valve block having a pair of valves for controlling the flow of gas to the torch, said valves being moved to open position by gas pressure, a torch support for closing said valves when the torch is supported therefrom, a stationary screw bolt carried by said valve block and extending through said torch support, a spring encircling said bolt for lifting the support, and a nut on said bolt above said support for limiting the movement of the latter.

2. A gas shut off device for torches comprising a valve body formed with a pair of upwardly facing annular chambers, each having an inlet and a centrally located relatively small boss with an outlet therethrough, diaphragms forming one wall of each chamber and adapted to be moved to position to close said outlet, plungers for engaging a relatively small portion of each diaphragm directly over said outlet to move the diaphragm to outlet closing position, a pivoted lever for supporting a torch and for engaging said plungers, means for adjusting the pivotal movement of said lever, and adjustable means carried by said lever for operating said plungers.

3. A gas shut off valve for torches, comprising a valve body, a pair of valves, a pair of plungers extending substantially parallel side by side, and controlling the flow of gas through said valves in accordance with the position of said plungers, a torch support pivoted to said valve body, and engaging the ends of said plungers, so that said plungers are moved into position to close the valves when the torch is supported on said support, spring means for urging said support into a position to permit said valves to be opened under gas pressure when the torch is removed from said support, adjustable means for limiting the position of said support when the torch is removed therefrom, whereby the extent of opening of said valves is correspondingly adjusted or prevented, and means on said support for regulating the longitudinal movement of said plungers independently of each other, whereby the extent of opening of each of said valves is correspondingly adjusted independently of each other.

4. A gas shut off valve for torches, comprising a valve body, a pair of valves, a pair of plungers controlling the flow of gas through said valves in accordance with their position, a torch support pivoted to said body, screw members passing through said support, and having the ends thereof impinging on the ends of said plungers, so that said plungers are moved into position to close the valves when the torch is supported on said support, said screw members being adjustable, whereby the longitudinal movement of said plungers is regulated independently of each other, and means for urging said support into a position to permit said valves to be opened under gas pressure when the torch is removed from said support.

Signed at Chicago in the county of Cook and State of Illinois this 14th day of November, A. D. 1929.

CHARLES L. BASTIAN.